US005742349A

United States Patent [19]

Choi et al.

[11] Patent Number: 5,742,349

[45] Date of Patent: Apr. 21, 1998

[54] MEMORY EFFICIENT VIDEO GRAPHICS SUBSYSTEM WITH VERTICAL FILTERING AND SCAN RATE CONVERSION

[75] Inventors: Tat Cheung Choi, Saratoga; Peter J. Lim, San Jose, both of Calif.

[73] Assignee: Chrontel, Inc., San Jose, Calif.

[21] Appl. No.: 646,523

[22] Filed: May 7, 1996

[51] Int. Cl.[6] .................... H04N 11/20

[52] U.S. Cl. .................... 348/443; 348/444; 348/447

[58] Field of Search .................... 348/910, 447, 348/443, 444, 459, 441, 453, 714; 345/154

[56] References Cited

U.S. PATENT DOCUMENTS

| | | | |
|---|---|---|---|
| 5,182,643 | 1/1993 | Futscher | 348/447 |
| 5,534,936 | 7/1996 | Kim | 348/910 |

*Primary Examiner*—Victor R. Kostak

*Attorney, Agent, or Firm*—Gary S. Williams; Flehr Hohbach Test Albritton & Herbert LLP

[57] ABSTRACT

A graphics subsystem converts a first graphics data stream for display on a computer monitor having a first refresh rate into a second graphics data stream for a television monitor having a second, slower refresh rate. The graphics subsystem has a first memory for storing one horizontal scan line of pixel data and a second memory for storing one half of a horizontal scan line of pixel data. Multiplexers direct data to a first summing circuit from an input port and from the first memory itself, so that a first horizontal line of input pixel data is initially stored in the first memory and a second horizontal line of input pixel data is combined with the first horizontal line of data by the first summing circuit, and the resulting combined pixel data is stored in back into the first memory. A controller sends the combined pixel data from the first memory to a second summing circuit while a next horizontal line of input pixel data is received. The second summing circuit combines that next horizontal line of input pixel data with data from the first memory so as to generate vertically averaged pixel data that is then stored in the second memory. The vertically averaged pixel data in the second memory is sent to an output port at a rate of no less than one half the rate at which pixel data is being received at the input port.

12 Claims, 9 Drawing Sheets

Time ↓

| VGA INPUT | | Line Memory A | | Line Memory B | | Line Memory C | |
|---|---|---|---|---|---|---|---|
| Line | Pixel | Write | Read | Write | Read | Write | Read |
| n-1 | 1 to 800 | (n-1,1) to (n-1,800) | | | | | |
| n | 1 to 800 | | | (n,1) to (n,800) | | | |
| n+1 | 1 to 800 | (n+1,1) to (n+1,800) | (n-1,1) to (n-1,800) | | (n,1) to (n,800) | (m,1) to (m,800) | (m,1) to (m,800) |
| n+2 | 1 to 800 | | | (n+2,1) to (n+2,800) | | | (m,1) to (m,800) |
| n+3 | 1 to 800 | (n+3,1) to (n+3,800) | (n+1,1) to (n+1,800) | | (n+2,1) to (n+2,800) | (m+1,1) to (m+1,800) | (m+1,1) to (m+1,800) |
| n+4 | 1 to 800 | | | (n+4,1) to (n+4,800) | | | (m+1,1) to (m+1,800) |

FIG. 5

Time ↓

| VGA INPUT Line | VGA INPUT Pixel | Line Memory A Write | Line Memory A Read | Line Memory B Write | Line Memory B Read | Line Memory C Write | Line Memory C Read |
|---|---|---|---|---|---|---|---|
| n-1 | 1 to 400 | X(n-1,1) to X(n-1,400) | | | | | |
| n-1 | 401 to 800 | | | X(n-1,401) to X(n-1,800) | | | |
| n | 1 to 400 | X(n-1,1) + 2*X(n,1) to X(n-1,400)+ 2*X(n,400) | X(n-1,1) to X(n-1,400) | | | | |
| n | 401 to 800 | | | X(n-1,401) + 2*X(n,401) to X(n-1,800)+ 2*X(n,800) | X(n-401,1) to X(n-1,800) | | |
| n+1 | 1 to 400 | X(n+1,1) to X(n+1,400) | X(n-1,1) + 2*X(n,1) to X(n-1,400)+ 2*X(n,400) | | | X(m,1) to X(m,400) | X(m,1) to X(m,400) |
| n+1 | 401 to 800 | | | X(n-401,1) to X(n-1,800) | X(n-1,401) + 2*X(n,401) to X(n-1,800)+ 2*X(n,800) | X(m,401) to X(m,800) | |
| | | | | | | | X(m,401) to X(m,800) |

$$X(m,k) = (1/4)*[X(n-1,k)+2*X(n,k)+X(n+1,k)]$$

FIG. 7

WRITE and READ Operations of Line Memory C

| WRITE | | READ | |
|---|---|---|---|
| INPUT | LOCATION | LOCATION | OUTPUT |
| X(m,1) | c1 | | |
| X(m,2) | c2 | c1 | X(m,1) |
| X(m,3) | c3 | | |
| X(m,4) | c4 | c2 | X(m,2) |
| X(m,5) | c5 | | |
| ⋮ | ⋮ | ⋮ | ⋮ |
| X(m,398) | c398 | c199 | X(m,199) |
| X(m,399) | c399 | | |
| X(m,400) | c400 | c200 | X(m,200) |
| X(m,401) | c1 | | |
| X(m,402) | c2 | c201 | X(m,201) |
| X(m,403) | c3 | | |
| ⋮ | ⋮ | ⋮ | ⋮ |
| X(m,795) | c395 | | |
| X(m,796) | c396 | c398 | X(m,398) |
| X(m,797) | c397 | | |
| X(m,798) | c398 | c399 | X(m,399) |
| X(m,799) | c399 | | |
| X(m,800) | c400 | c400 | X(m,400) ← POINT OF POSSIBLE CONTENTION |
| WRITING COMPLETE FOR LINE m | | | |
| | | c1 | X(m,401) |
| | | ⋮ | ⋮ |

FIG. 8

MEMORY EFFICIENT VIDEO GRAPHICS SUBSYSTEM WITH VERTICAL FILTERING AND SCAN RATE CONVERSION

The present invention relates generally to the display of computer graphics information on a television screen. In particular, the invention relates to a memory efficient video graphics subsystem that performs weighted averaging of several lines of data to be displayed on the television's screen in order to reduce the visible flicker in the display.

BACKGROUND OF THE INVENTION

The primary object of the present invention is to reduce the amount of memory required for vertical filtering and scan rate conversion in a graphics subsystem that encodes graphics data for personal computer systems into signals that can be used to display the information on an ordinary television screen.

Shown in FIG. 1 is the functional diagram for a VGA (Video Graphics Array) graphics subsystem 100 typical of those used in personal computers. Data representing the pixels to be displayed is stored in a video display memory 102. In normal operation, this data is accessed by the VGA controller 104, serialized at an appropriate rate, and fed to a so-called RAMDAC™ 106 that combines a color palette random access memory with the three digital-to-analog converters used to drive a CRT monitor 108. In many of the possible display modes in such a system, the data retrieved from display memory and sent to the RAMDAC 106 represents addresses for the color palette RAM, which stores various combinations of digitally encoded red, green and blue (RGB) data. Typically, the intensity of each of the primary colors is encoded in a digital word 5 to 8 bits long. The digitized color information accessed in the palette RAM is converted to three analog RGB signals by three digital-to-analog converters with the appropriate resolution, and these analog signals drive the three separate primary color inputs of the display monitor 108.

The signals used to drive the screen of an ordinary television set (not shown in FIG. 1) are based on the encoding of the display information according to either NTSC (National Television Systems Committee) or PAL (Phase Alternation Line) formats. Although the following discussion addresses only NTSC encoding, the requirements for PAL encoding are similar and, for the most part, can be met for with only minor modifications to an NTSC system.

Several basic functions must be implemented in order to generate NTSC (or PAL) signals from the data for a VGA display; namely, (1) NTSC timing signals together with underscan, (2) flicker reduction by means of vertical filtering, and (3) the encoding of the RGB information into composite NTSC or S-Video formats.

In the NTSC format, 525 horizontal lines are scanned at a rate of approximately 15.75 kHz. The scan is interleaved at a one-half frame rate of 60 Hz, resulting in a full frame refresh rate of 30 Hz. The VGA graphics data must be converted into this format with provisions made to ensure that the full graphics screen is visible on the television screen. For ordinary NTSC encoded pictures, TV monitors are typically overscanned; that is, the outside edges of the picture are not visible because they have been scanned off the actual display screen. Display of the full graphics screen is accomplished through the use of an NTSC pixel rate that is slightly higher than one half the scan rate for the VGA mode, which results in a slight horizontal underscan. Essentially, the number of pixels in a horizontal line is increased so that the information carrying pixels represent a smaller fraction of the full line.

Flicker becomes obvious in a raster scan display if the full screen refresh rate is less than 50 Hz. For noninterlaced displays operating at a frame refresh rate of 70 Hz, flicker is not very noticeable. However, at the low full frame refresh rate of 30 Hz for an NTSC display, flicker becomes a very serious problem. The effect is especially pronounced in displays of alternating dark and light horizontal lines, and is apparent at long horizontal edges in a stationary display.

The apparent flicker in a raster scan display can be reduced by means of vertical filtering. Such filtering is accomplished by convolving, in the vertical direction, the component RGB values with a predefined smoothing impulse response shape. This reduces the vertical frequency component of the display, which results in less variation in the luminance between half frames and thus less flicker.

Perhaps the simplest smoothing impulse shape is a rectangle two pixels (lines) high. In an interlaced raster scan display, such a filter is equivalent to generating the equally-weighted average of each color component for a displayed pixel and the non-displayed pixel directly above it for each half frame. Thus, this type of filtering is referred to as "1-1 averaging." If m represents an odd integer denoting the vertical line number (Y position) and n is an integer denoting the horizontal pixel position, then when an odd-line half-frame is being displayed the RGB components actually displayed for a pixel are the average of the RGB values for that pixel and the RGB values for the even-line pixel directly above it; that is, for 1:1 averaging $$R_{DISPLAY}(m,n)=0.5*R(m,n)+0.5*R(M-1, n)$$

$$G_{DISPLAY}(m,n)=0.5*G(m,n)+0.5*G(m-1, n)$$

$$B_{DISPLAY}(m,n)=0.5*G(m,n)+0.5*B(m-1, n)$$

Another simple impulse shape for vertical filtering is a weighted average of a pixel with the corresponding pixels in the preceding and succeeding lines (the undisplayed pixels directly above and below the displayed pixel), and with relative weighting factors of 1, 2 and 1. The displayed RGB components for such 1:2:1 averaging are $$R_{DISPLAY}(m,n)=0.25*R(m-1, n)+0.5*R(m,n)+0.25*R(m+1, n)$$

$$G_{DISPLAY}(m,n)=0.25*G(m-1, n)+0.5*G(m,n)+0.25*G(m+1, n)$$

$$B_{DISPLAY}(m,n)=0.25*B(m-1, n)+0.5*B)(m,n)+0.25*B(m+1, n)$$

Flicker reduction can be accomplished by vertical filtering of either analog or digital signals representing the RGB components. FIG. 2 illustrates a typical analog implementation of 1:1 averaging. In this implementation two sets of analog RGB signals, one for line m and one for line m−1 must be made available simultaneously during the time that the ruth line is being displayed. Moreover, these signals must be provided at the NTSC line rate, not at the higher VGA scan-rate. As depicted in FIG. 2, the pairs of analog RGB signals are first added and then attenuated by a factor of 2 to generate the RGB signals that are then fed to an analog NTSC encoder.

In the analog implementation of FIG. 2 it is apparent that two RAMDAC's will be needed in order to simultaneously provide the two sets analog RGB signals for the filter inputs. In a normal NTSC scan without vertical filtering, only a single set of RGB signals, corresponding to the line being displayed, is needed during a half-frame, and the delay between consecutive lines is approximately 16.7 msec. A delay of this length cannot be provided economically with an analog delay line; thus the need for two RAMDAC's. As a consequence, an obvious disadvantage of the analog approach is that an additional set of three D/A converters is required for each additional line included in the weighted averaging. In addition, it is not easy to modify an analog implementation so as to alter the filtering algorithm.

A digital implementation of vertical filtering offers a robust, flexible and potentially efficient means of reducing flicker when displaying computer graphics on a television monitor, and a digital approach has been adopted in most low-end, stand-alone VGA-to-NTSC encoders. Shown in FIG. 3 is a graphics circuit architecture that is representative of the type that is used to perform both vertical filtering and scan rate conversion digitally.

In a VGA-to-NTSC conversion 130 system such as that depicted in FIG. 3, software is used to convert each supported graphics mode to the so-called mode 11 or mode 12 IBM graphics modes, which have a resolution of 640×480 pixels, a pixel clock rate of 25.18 MHZ and a vertical frequency of 60 Hz. Data in this format then serves as the incoming RGB information depicted in FIG. 3. In order to perform 1:1 vertical filtering, every odd (or even) line of input data in FIG. 3 is directed to a line buffer 132, while the subsequent even (or odd) line bypasses the buffer. The line buffer has a delay of exactly one mode 11 horizontal line, and the output of the buffer is averaged by averaging circuit 134 with the current line being input. Thus, each alternate line is averaged with the immediately preceding line.

The graphics data produced by the averaging at the output of the line buffer is a vertically filtered line that is scanned at the VGA pixel rate of 25.18 MHZ. To slow this rate to an NTSC rate, with provision for horizontal underscan, the data is written into an asynchronous dual-port RAM 136 at 25.18 MHZ and then read out at the NTSC scan rate, which is slightly greater than half the 25.18 MHZ rate (for example, 13.8 MHZ).

The implementation of FIG. 3 suffers from the need for relatively large amounts of memory. In this example, only 1:1 filtering is done, and two full lines of memory are required. For more complex filtering, the memory demands become correspondingly more severe.

Shown in FIG. 4 is an extension of the architecture in FIG. 3 to 1:2:1 (three line) averaging. This system 150 requires three lines of memory: two line buffers 152, 154 for the vertical filtering and a one-line dual port memory 156 for scan rate conversion. The resulting total memory required is 3 (lines)×800 (pixels/line)×3 (color components)×8 (bits/color)=57,600 bits.

Shown in FIG. 5 is a timing diagram for the system of FIG. 4, illustrating the read/write modes for the three memory banks. Each color component is treated separately under the same control mechanisms. In this system, the incoming (n−1)th VGA line, consisting of the color components of pixels (n−1,1) through (n−1,800), is written into memory A. The next VGA line, consisting of pixels (n,1) through (n,800), is written into line memory B. As the third line, n+1, is written into line memory A, the existing contents of memory banks A and B are read out. At this point, values for all three vertically adjacent pixel values, (n−1,k), (n,k) and (n+1,k) are available, and a weighted average of these values is generated using a summing circuit 158 and stored in memory bank C 156, as NTSC pixels (m,1) through (m,800). Note that the multiplier circuits shown in FIG. 4 are implemented simply by shifting the inputs to the summer by one bit position for the "×0.5" multiplier and by two bit positions for the "×0.25" multipliers.

Scan-rate conversion is accomplished as follows in FIG. 4. Color components of the NTSC pixels (m,1) through (800) are written into line memory C 156 at the VGA pixel rate. At the same time, these values are read out of line memory C at the NTSC rate (approximately half the VGA pixel rate). The read out may start as soon as the writing begins. If the NTSC rate were exactly half the VGA rate, then (m,400) would be read out as (m,800) was being written.

The architecture of FIG. 4 is relatively efficient. Only three line memories are required to implement both three line averaging and scan rate conversion.

SUMMARY OF THE INVENTION

It is a primary object of the present invention to provide a VGA-to-NTSC/PAL conversion graphics subsystem for vertical filtering and scan rate conversion that requires significantly less memory than is needed with conventional approaches. It is a related goal of the present invention to provide a graphics subsystem that performs the same functions as the systems depicted in FIGS. 3 and 4. Another goal of the present invention, in the case of three line averaging and scan-rate conversion, is to require only one and one-half lines of memory as opposed to the three lines of memory required in a conventional graphics subsystem that performs three line averaging and scan-rate conversion. Thus it is a goal of the present invention to provide a 50% reduction in memory for this specific application.

In summary the present invention is a graphics subsystem for vertical filtering and scan rate conversion. In a preferred embodiment the graphics subsystem converts a first graphics data stream for display on a computer monitor having a first refresh rate into a second graphics data stream for a television monitor having a second, slower refresh rate. The graphics subsystem has an input port for receiving the first graphics data stream, a first memory for storing one horizontal scan line of pixel data and a second memory for storing one half of a horizontal scan line of pixel data. A first summing circuit has an output coupled to an input of the first memory and a second summing circuit has an output coupled to an input of the second memory. The second summing circuit receives data to be summed from the first memory and the input port.

Multiplexers direct data to the first summing circuit from the input port and from the first memory itself, so that for sequentially received first and second horizontal lines of input pixel data in the first graphics data stream, the first horizontal line of input pixel data is initially stored in the first memory and the second horizontal line of input pixel data is combined with the first horizontal line of data by the first summing circuit, and the resulting combined pixel data is stored in back into the first memory.

A controller sends the combined pixel data from the first memory to the second summing circuit while a next horizontal line of input pixel data is received at the input port. The second summing circuit forming a combination of that next horizontal line of input pixel data with the combined pixel data from the first memory so as to generate vertically averaged pixel data that is then stored in the second memory. The controller then sends the vertically averaged pixel data stored in the second memory to an output port at a rate of no less than one half the rate at which pixel data is being received at the input port. As a result, one horizontal line of vertically averaged pixel data is sent to the output port for each two horizontal lines of input pixel data received.

BRIEF DESCRIPTION OF THE DRAWINGS

FIG. 5 is a timing diagram illustrating the reading and writing of the memory banks in the subsystem of FIG. 4.

FIG. 7 is timing diagram illustrating the manner in which the memory banks in FIG. 6 are read and written.

FIG. 8 is a table depicting the writing and reading of data into and out of memory bank C in FIG. 6.

DESCRIPTION OF THE PREFERRED EMBODIMENT

Figure 1:
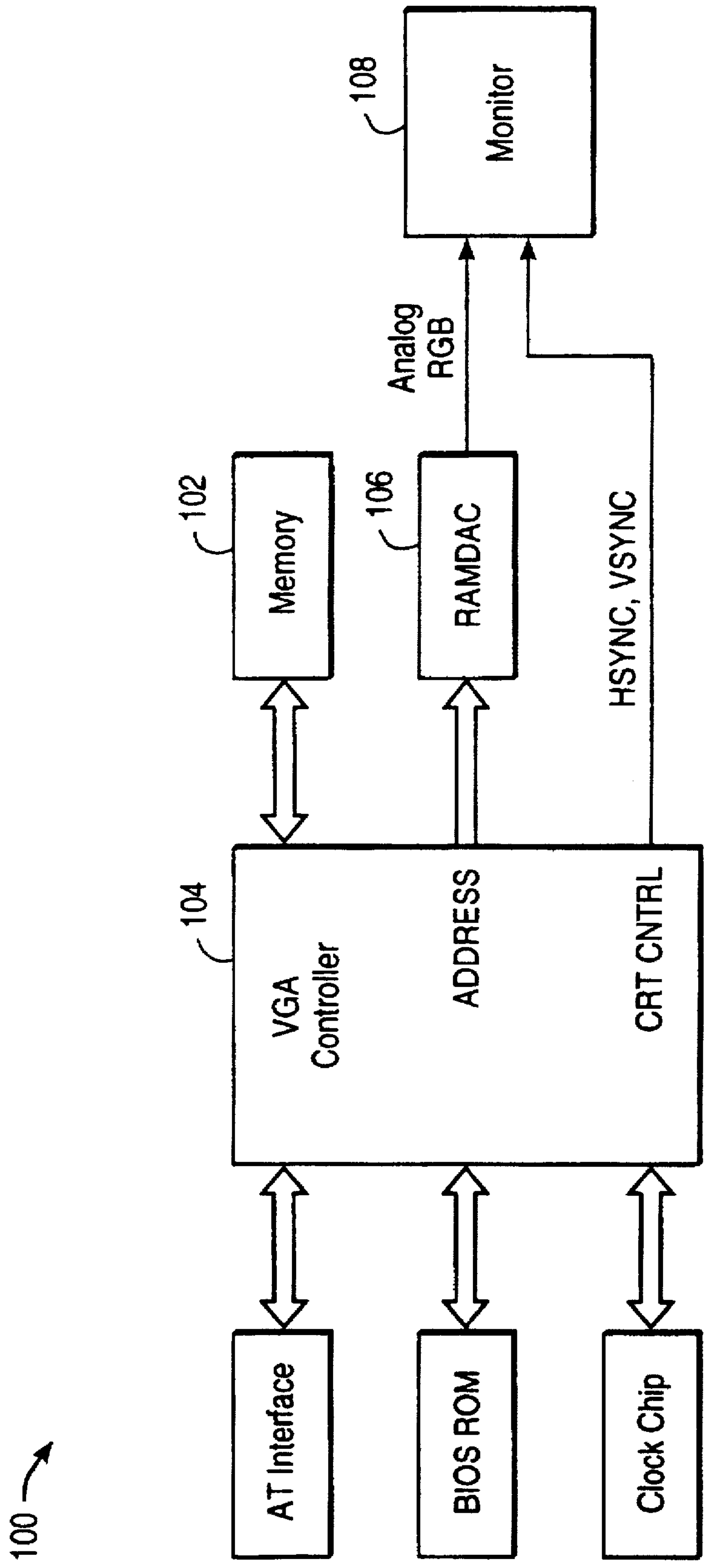
FIG. 1 (PRIOR ART)
FIG. 1 is a functional diagram of a typical VGA graphics subsystem.
Figure 2:
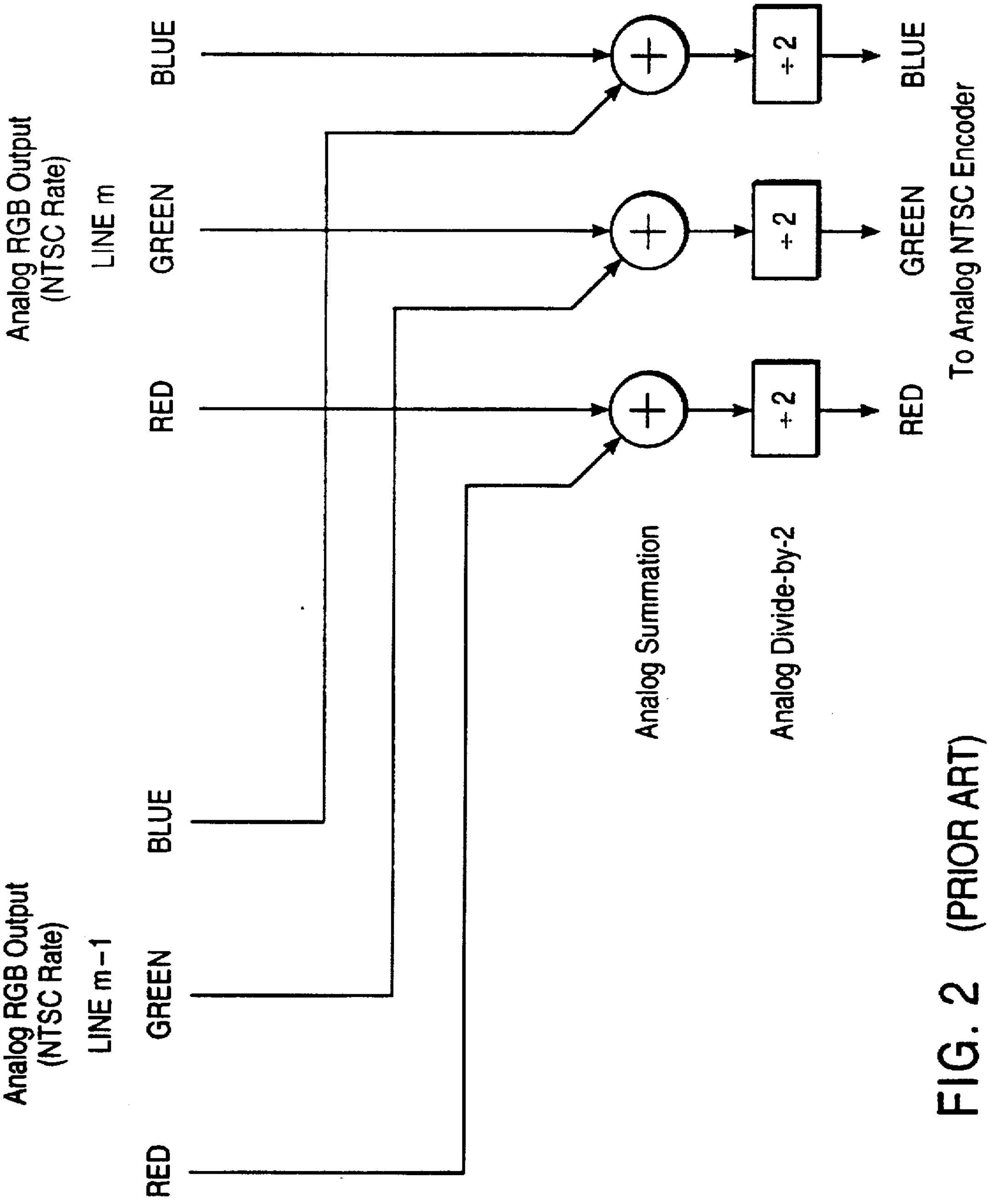
FIG. 2 (PRIOR ART)
FIG. 2 illustrates an analog implementation of 1:1 averaging for flicker reduction in a raster scan display.
Figure 3:
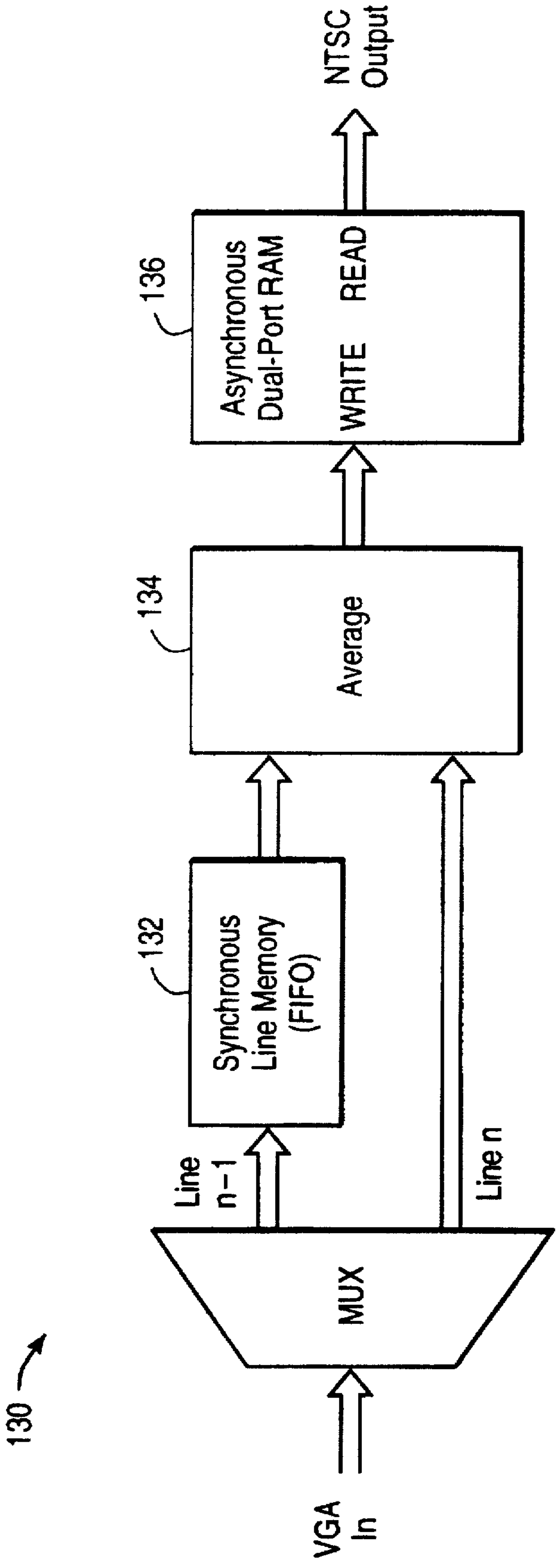
FIG. 3 (PRIOR ART)
FIG. 3 depicts the architecture of a digital subsystem both vertical filtering and scan rate conversion.
Figure 4:
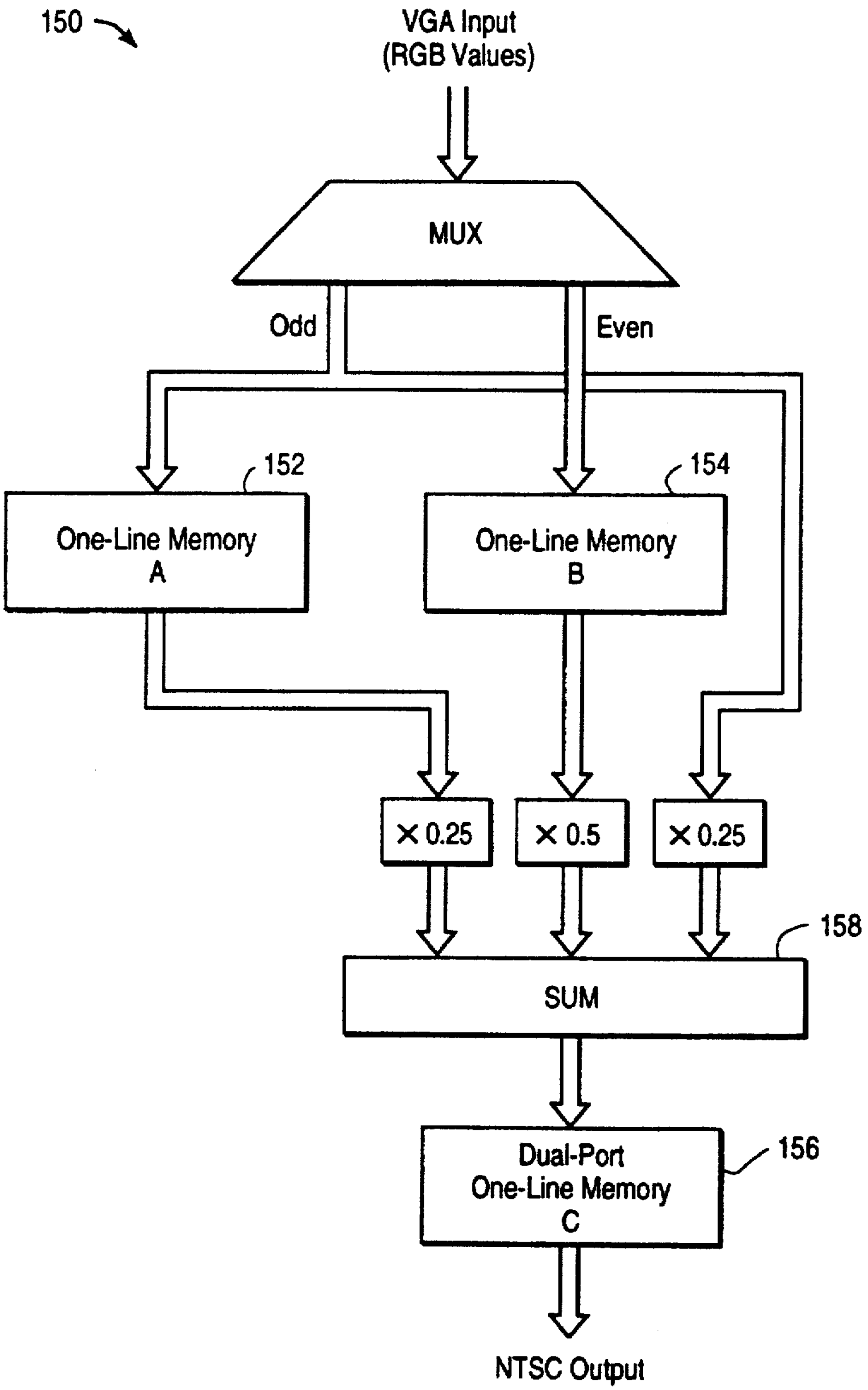
FIG. 4 depicts an extension of the architecture shown in FIG. 3 to accomplish three line, 1:2:1, vertical averaging.
Figure 6:
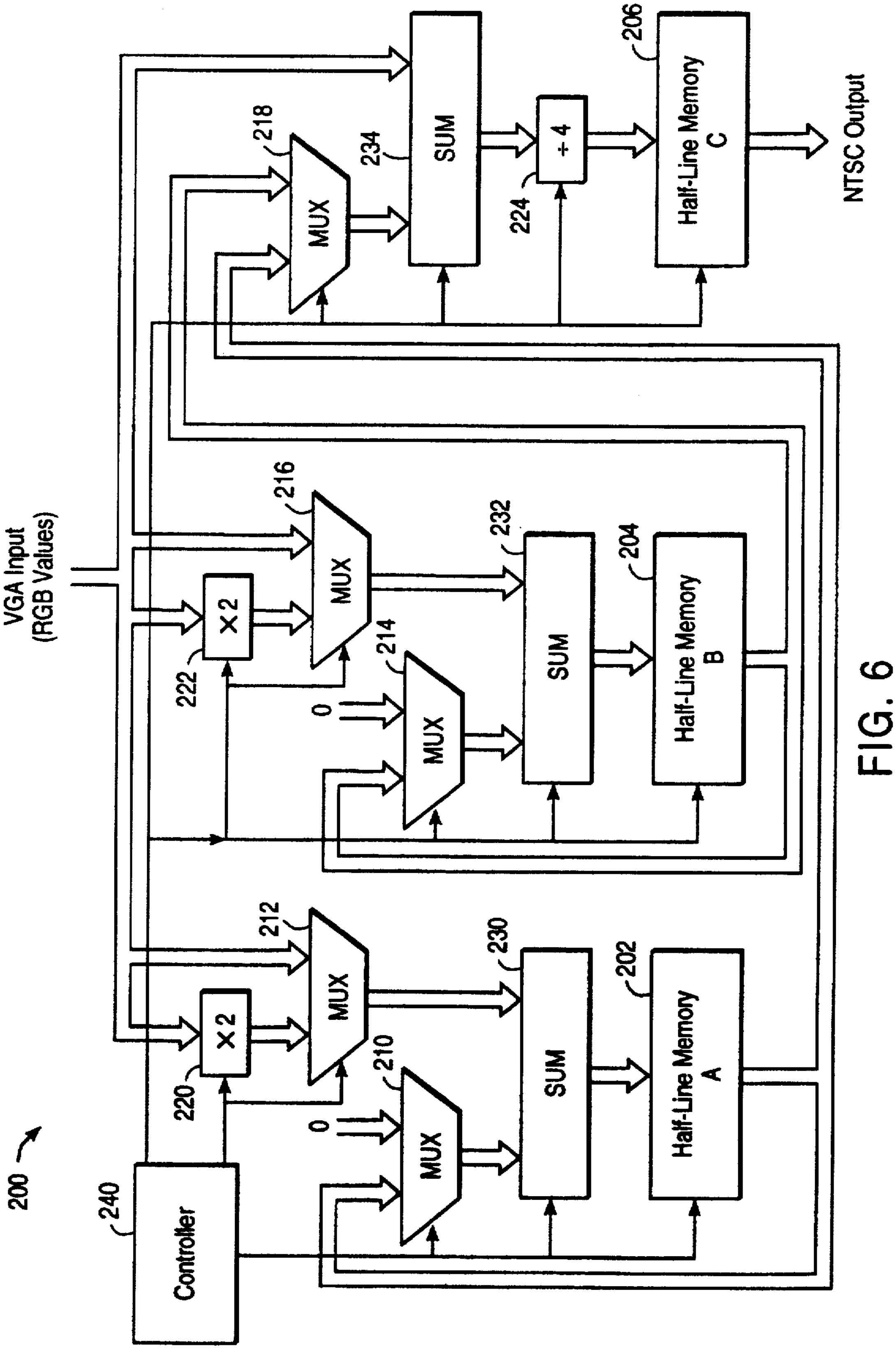
FIG. 6 is a block diagram of a preferred embodiment of the present invention for implementing 1:2:1 averaging.

FIG. 6 shows a VGA-to-NTSC/PAL graphics conversion subsystem 200 that represents one embodiment of the present invention. The graphics conversion subsystem 200 provides 1:2:1 vertical data averaging and scan-rate conversion. It provides exactly the same functions as the system 150 of FIG. 4. A timing diagram illustrating the operation of the system 200 in FIG. 6 is shown in FIG. 7.

The architecture of FIG. 6 is basically characterized by two functional memory blocks: a one-line memory and a final half-line memory. However, to simplify the implementation the blocks can be designed as three half-line memory banks, A (202), B (204) and C (206). Memory banks A and B 202, 204 function together as one line of memory. Multiplexers 210, 212, 214, 216 and 218 are used to control the flow of pixel data values to and from the various memory banks, shifters 220, 222 and 224 are actually just wire connections that shift pixel data values by the appropriate number of bits to perform a multiply by 2 or a divide by four operation, and summing circuits 230, 232 and 234 are used to perform the vertical data averaging function. By making the shifters 220, 222, 224 into programmable shifting circuits, a number of different 3-line vertical data averaging functions can be implemented using software controls. In particular, a software controlled control circuit 240 sends address and control signals to the multiplexers, shifters and memory banks so as to control the operation of the graphics subsystem 200.

The memory banks 202, 204, 206 may be implemented using either static memory (SRAM) or dynamic memory (DRAM). DRAM, which save space and consumes less power, can be use because all memory cells in the memory banks are accessed periodically in a relatively short period of time.

Referring to the timing diagram in FIG. 7, the system of FIG. 6 operates as follows. The first half of line n−1 is stored into memory bank A, and the second half of line n−1 is stored in memory bank B. Just as line n becomes available at the input to the graphics subsystem 200, the contents of memory A 202 are read out. Thus, pixels (n,1) through (n,400) are available at the same time as pixels (n−1,1) through (n−1,400). The corresponding values are summed to form the weighted partial sum, X(n−1,k)+2*X(n,k), which is written back into memory bank A 202. The variable X refers to the digital value of a primary color component, where X represents R (red), G (green) and B (blue).

Similarly, the weighted partial sum of the second half of line n and data read out from memory B (the second half of line n−1) is written back into memory bank B. Next, when the graphics data for line n+1 becomes available at the input to the graphics subsystem, read out of bank A begins again. At this time, the pixel values X(n+1,k) are available at the same time that the partial sum values X(n−1,k)+2*X(n,k) are read from memory A. These values are summed to create the weighted values X(n−1,k)+2*X(n,k)+X(n+1,k), which are divided by 4 to generate the desired weighted average values for R, G and B and then stored in the half-line memory bank C.

As the first half of line n+1 becomes available at the input, it is also written into memory A. The vertical averaging function of the graphics subsystem can thus proceed seamlessly for alternate lines in the display.

The second half of line n+1 is treated in the same manner as the first half, with its values added to the corresponding partial sums stored in memory bank B. However, in order to write the weighted average output into memory C, it is necessary that values for the first half of the line that were stored in C be read out before the values from the second half of the line are written. The contents of memory C are read out at the slow NTSC rate, which is half, or slightly faster than half, the VGA pixel rate.

The critical timing constraint in the system of FIG. 6 occurs during scan rate conversion when data is written into memory bank C at the VGA pixel rate, while date is being read from this memory at the NTSC scan rate. The worst case situation occurs for the slowest NTSC scan rate, which corresponds to reading memory C at exactly one-half the rate that the memory is being written. A table illustrating the read and write operations for this memory is shown in FIG. 8. In this worst case situation, there is a possible contention for a memory location only when the value for pixel (m,400) is being read from location c400 in memory C.

As shown in FIG. 7, at the same time the value for pixel (m,800) is being written into the same location (c400). This is not a serious problem, and a number of approaches can be used to ensure valid data is not overwritten. One would be simply to ensure that a word in memory C is read before it is written. This potential problem could also be overcome by adding one word to the memory and addressing the memory in a circular fashion. In any case, if the NTSC rate is slightly higher than half the VGA pixel rate, as will generally be the case in order to provide horizontal underscan, there will be no contention in memory C.

In order to avoid truncation errors, memory banks A and B in FIG. 6 should be made 10 bits wide, rather than 8 bits wide, so as to be able to store the full partial products, which can have a maximum value of $3*2^8$. The resulting total memory required is 3 (half lines)×400 (pixels/line)×28 (bits/pixel)=33,600 bits. This is about a 41.5% reduction (24,000 bits) from the 57,600 bits of memory required by the graphics subsystem shown in FIG. 4.

With the graphics subsystem architecture of FIG. 6 it is straightforward to implement any type of three-line averaging simply by generating the appropriate partial products. Vertical filtering modes 1:3:1, 1:2:1, 1:1:0, and 0:1:0 (no filtering) are implemented in a programmable fashion through proper controls of the subsystem's multiplexers.

Figure 9:
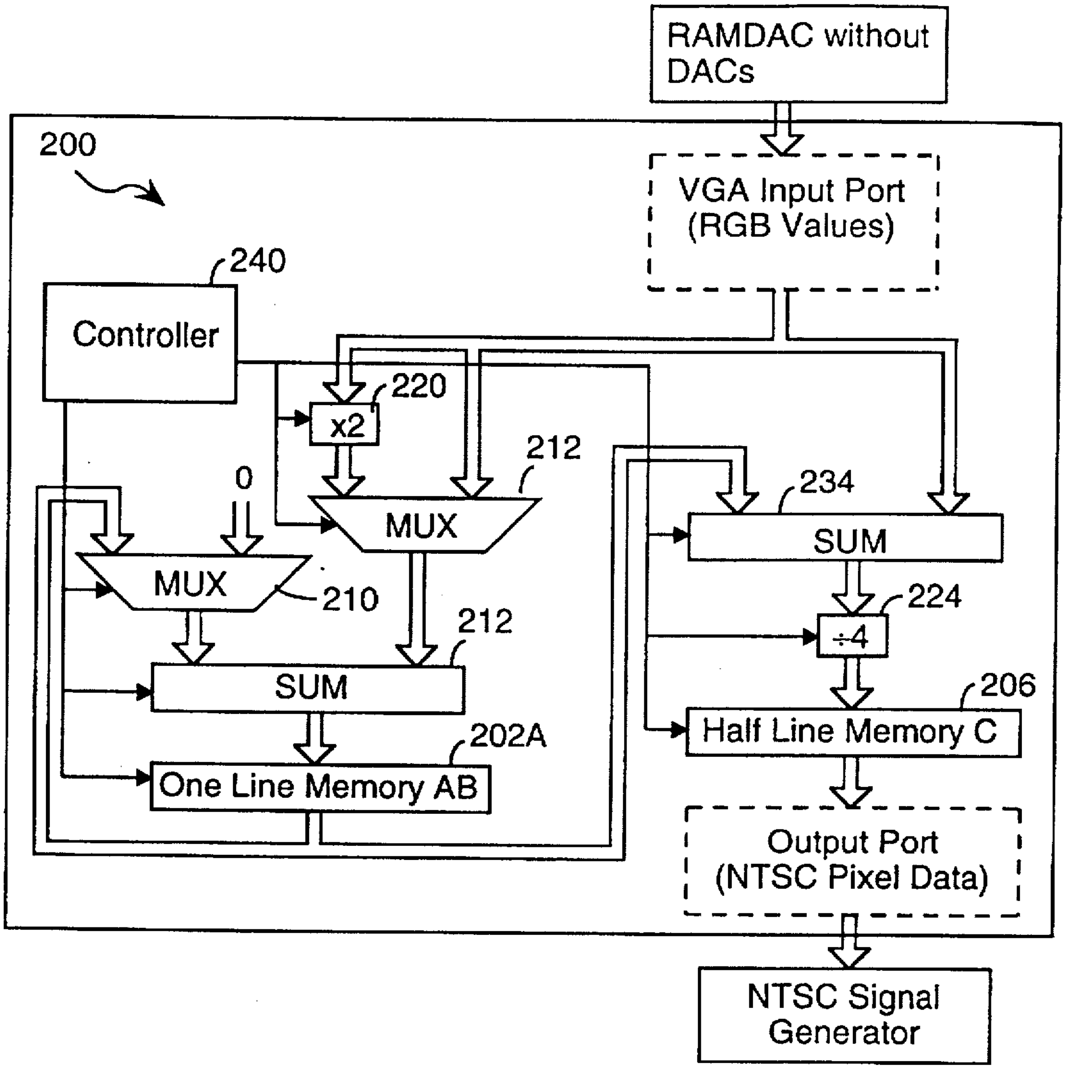
FIG. 9 is a block diagram of a second preferred embodiment of the present invention for implementing 1:2:1 averaging.

FIG. 9 shows an alternate version of the circuit of FIG. 6, in which half-line memory banks A and B are combined into a full line memory bank. The operation of the circuit of FIG. 9 is essentially the same as that of FIG. 6, but the number of multiplexers and summing circuits is reduced.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A graphics subsystem for converting a first graphics data stream for display on a computer monitor having a first refresh rate into a second graphics data stream for a television monitor having a second, slower refresh rate, comprising:

an input port for receiving said first graphics data stream;

a first memory for storing one horizontal scan line of pixel data;

a second memory for storing one half of a horizontal scan line of pixel data;

a first summing circuit having an output coupled to an input of said first memory and a second summing circuit having an output coupled to an input of said second memory; said second summing circuit having inputs coupled to the output of said first memory and to said input port;

multiplexers for directing data to said first summing circuit from said input port and from said first memory so that, for sequentially received first and second horizontal lines of input pixel data in said first graphics data stream, said first horizontal line of input pixel data is initially stored in said first memory and said second horizontal line of input pixel data is combined with said first horizontal line of data by said first summing circuit and the resulting combined pixel data is stored in said first memory; and a controller for sending said combined pixel data from said first memory to one of said inputs of said second summing circuit while a next horizontal line of input pixel data is received at said input port;

said second summing circuit forming a combination of said next horizontal line of input pixel data with said combined pixel data to generate vertically averaged pixel data that is then stored in said second memory; and said controller sending said vertically averaged pixel data stored in said second memory to an output port at a rate of no less than one half the rate at which pixel data is being received at said input port, wherein one horizontal line of said vertically averaged pixel data is sent to said output port for each two horizontal lines of input pixel data received at said input port.

2. The graphics subsystem of claim 1, wherein said first and second summing circuits cooperatively generate said vertically averaged pixel data in the form of R, G and B components in accordance with the following equations:

$$R_{DISPLAY}(m,n)=0.25*R(m-1,n)+0.5*R(m,n)+0.25*R(m+1, n)$$

$$G_{DISPLAY}(m,n)=0.25*G(m-1, n)+0.5*G(m,n)+0.25*G(m+1, n)$$

$$B_{DISPLAY}(m,n)=0.25*B(m-1, n)+0.5*B)(m,n)+0.25*B(m+1, n)$$

where $R_{DISPLAY}$(m,n), $G_{DISPLAY}$ and $B_{DISPLAY}$(m,n) represent said vertically averaged pixel data, R(m,n), G(m,n), and B(m,n) represent said input pixel data, m−1, m and m+1 respectively indicate said first, second and next horizontal lines of input pixel data and n represents each individual pixel within a horizontal line of pixel data.

3. The graphics subsystem of claim 2, including data shifting circuits for shifting selected ones of the data values input to said first summing circuit, and for shifting data values output by said second summing circuit so as to generated weighted sums of pixel data in sequentially related horizontal lines of input pixel data.

4. The graphics subsystem of claim 1, including data shifting circuits for shifting selected ones of the data values input to said first summing circuit, and for shifting data values output by said second summing circuit so as to generated weighted sums of pixel data in sequentially related horizontal lines of input pixel data.

5. A graphics subsystem for converting a first graphics data stream for display on a computer monitor having a first refresh rate into a second graphics data stream for a television monitor having a second, slower refresh rate, comprising:

an input port for receiving said first graphics data stream;

a first memory for storing one horizontal scan line of pixel data;

a second memory for storing one half of a horizontal scan line of pixel data;

data processing circuitry for summing predefined combinations of data received from said input port and data stored in said first memory to produce intermediate data for storage in said first memory and final data for storage in said second memory;

multiplexers for directing data to said data processing circuitry from said input port and from said first memory so that, for sequentially received first and second horizontal lines of input pixel data in said first graphics data stream, said first horizontal line of input pixel data is initially stored in said first memory and said second horizontal line of input pixel data is combined with said first horizontal line of data by said data processing circuitry and the resulting combined pixel data is stored in said first memory; and a first data path and control circuitry for sending said combined pixel data from said first memory to said data processing circuitry while a next horizontal line of input pixel data is received at said input port, said data processing circuitry forming a combination of said next horizontal line of input pixel data with said combined pixel data to generate vertically averaged pixel data that is then stored in said second memory; and a second data path for sending said vertically averaged pixel data stored in said second memory to an output port at a rate of no less than one half the rate at which pixel data is being received at said input port, wherein one horizontal line of said vertically averaged pixel data is sent to said output port for each two horizontal lines of input pixel data received at said input port.

6. The graphics subsystem of claim 5, wherein said data processing circuitry generates said vertically averaged pixel data in the form of R, G and B components in accordance with the following equations:

$$R_{DISPLAY}(m,n)=0.25*R(m-1, n)+0.5*R(m,n)+0.25*R(m+1, n)$$

$$G_{DISPLAY}(m,n)=0.25*G(m-1,n)+0.5*G(m,n)+0.25*G(m+1,n)$$

$$B_{DISPLAY}(m,n)=0.25*B(m-1,n)+0.5*B)(m,n)+0.25*B(m+1,n)$$

where $R_{DISPLAY}$(m,n) $B_{DISPLAY}$(m,n) represent said vertically averaged pixel data, R(m,n), G(m,n), and B(m,n) represent said input pixel data, m−1, m and m+1 respectively indicate said first, second and next horizontal lines of input pixel data and n represents each individual pixel within a horizontal line of pixel data.

7. The graphics subsystem of claim 6, including data shifting circuits for shifting selected ones of the data values input to said data processing circuitry, and for shifting data values output by said second summing circuit so as to generated weighted sums of pixel data in sequentially related horizontal lines of input pixel data.

8. The graphics subsystem of claim 1, including data shifting circuits for shifting selected ones of the data values input to said data processing circuitry, and for shifting data values output by said second summing circuit so as to generated weighted sums of pixel data in sequentially related horizontal lines of input pixel data.

9. A method of converting a first graphics data stream for display on a computer monitor having a first refresh rate into a second graphics data stream for a television monitor having a second, slower refresh rate, comprising the steps of:

receiving said first graphics data stream at an input port;

for sequentially received first and second horizontal lines of input pixel data in said first graphics data stream, initially storing said first horizontal line of input pixel data in a first memory, combining said second horizontal line of input pixel data with said first horizontal line of data, and then storing the resulting combined pixel data in said first memory; and forming a combination of a next horizontal line of input pixel data with said combined pixel data stored in said first memory to generate vertically averaged pixel data that is then stored in a second memory; wherein said first memory stores one horizontal scan line of pixel data and said second memory stores one half of a horizontal scan line of pixel data; and sending said vertically averaged pixel data stored in said second memory to an output port at a rate of no less than one half the rate at which pixel data is being received at said input port, wherein one horizontal line of said vertically averaged pixel data is sent to said output port for each two horizontal lines of input pixel data received at said input port.

10. The method of claim 9, wherein said vertically averaged pixel data is generated in the form of R, G and B components in accordance with the following equations:

$$R_{DISPLAY}(m,n)=0.25*R(m-1,n)+0.5*R(m,n)+0.25*R(m+1,n)$$

$$G_{DISPLAY}(m,n)=0.25*G(m-1,n)+0.5*G(m,n)+0.25*G(m+1,n)$$

$$B_{DISPLAY}(m,n)=0.25*B(m-1,n)+0.5*B)(m,n)+0.25*B(m+1,n)$$

where $R_{DISPLAY}$(m,n), $G_{DISPLAY}$(m,n), and $B_{DISPLAY}$(m,n) represent said vertically averaged pixel data, R(m,n), G(m, n), and B(m,n) represent said input pixel data, m−1, m and m+1 respectively indicate said first, second and next horizontal lines of input pixel data and n represents each individual pixel within a horizontal line of pixel data.

11. The method of claim 10, including shifting selected ones of the received data values and shifting said vertically averaged pixel data so as to generated weighted sums of pixel data in sequentially related horizontal lines of input pixel data.

12. The method of claim 9, including shifting selected ones of the received data values and shifting said vertically averaged pixel data so as to generated weighted sums of pixel data in sequentially related horizontal lines of input pixel data.

* * * * *